United States Patent
Qiang et al.

(10) Patent No.: US 9,774,377 B2
(45) Date of Patent: Sep. 26, 2017

(54) METHOD AND DEVICE FOR RANK ADAPTATION

(71) Applicant: Telefonaktiebolaget L M Ericsson (publ), Stockholm (SE)

(72) Inventors: Yongquan Qiang, Beijing (CN); Jinhua Liu, Beijing (CN); Hai Wang, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 14/889,189

(22) PCT Filed: May 6, 2013

(86) PCT No.: PCT/CN2013/075183
§ 371 (c)(1),
(2) Date: Nov. 5, 2015

(87) PCT Pub. No.: WO2014/179917
PCT Pub. Date: Nov. 13, 2014

(65) Prior Publication Data
US 2016/0100410 A1    Apr. 7, 2016

(51) Int. Cl.
*H04B 7/04* (2017.01)
*H04L 25/02* (2006.01)
(Continued)

(52) U.S. Cl.
CPC ....... *H04B 7/0486* (2013.01); *H04L 25/0204* (2013.01); *H04L 25/0224* (2013.01); *H04W 72/06* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 2009/0202014 A1* | 8/2009 | Mujtaba | H04B 7/0417 375/267 |
| 2011/0222616 A1 | 9/2011 | Jiang et al. | |
| 2015/0304083 A1* | 10/2015 | Kim | H04L 5/0048 370/329 |

FOREIGN PATENT DOCUMENTS

| | | | |
|---|---|---|---|
| CN | 102035580 A | 4/2011 | |
| CN | 102739342 A | 10/2012 | |

(Continued)

OTHER PUBLICATIONS

PCT Notification of Transmittal of the International Search Report and the Written Opinion of the International Searching Authority, or the Declaration for International application No. PCT/CN2013/075183, dated Feb. 20, 2014.

*Primary Examiner* — Joseph Bednash
(74) *Attorney, Agent, or Firm* — Baker Botts, LLP

(57) ABSTRACT

One of the embodiments of the present invention relates to a method for rank adaptation at a base station. The method comprises performing, during a rank sounding time interval, data transmission for a user equipment by using a sounding rank. The sounding rank is different from a transmission rank that is used in a transmission time interval immediately prior to the rank sounding time interval. The method further comprises determining whether spectrum efficiency for the user equipment under the condition of using the sounding rank is better than spectrum efficiency under the condition of using the transmission rank; and adjusting, in response to a positive result obtained from the determining step, the transmission rank to the sounding rank so as to be used during a transmission time interval immediately next to the rank sounding time interval. The present invention also relates to corresponding base station device.

18 Claims, 8 Drawing Sheets

(51) Int. Cl.
*H04W 72/06* (2009.01)
*H04W 72/08* (2009.01)

(56) References Cited

FOREIGN PATENT DOCUMENTS

| | | |
|---|---|---|
| CN | 102843210 A | 12/2012 |
| CN | 102970717 A | 3/2013 |
| WO | WO 2012/044236 A1 | 4/2012 |
| WO | WO 2014/183286 A1 | 11/2014 |

* cited by examiner

METHOD AND DEVICE FOR RANK ADAPTATION

PRIORITY

This nonprovisional application is a U.S. National Stage Filing under 35 U.S.C. §371 of International Patent Application Serial No. PCT/CN2013/075183, filed May 6, 2013, and entitled "Method And Device For Rank Adaptation."

TECHNICAL FIELD

The embodiments of the present invention generally relate to wireless communication, particularly to a method and device for rank adaptation.

DESCRIPTION OF THE RELATED ART

In the $3^{rd}$ Generation Partner Project (3GPP) Long Term Evolution (LTE) system, Multiple Input Multiple Output (MIMO) techniques, such as open-loop and close-loop spatial multiplexing, are introduced to improve spectrum efficiency and network capacity. For these transmission modes (e.g. TM3, TM4 and TM8 in 3GPP Release-9), single layer or multiple layers can be applied based on a radio channel's quality and rank.

Rank generally represents the number of transmission layers for wireless communication between a base station (e.g., enhanced Node B (eNB)) and a user equipment (UE) in a MIMO system. Taking rank 1 and rank 2 downlink transmission as an example, the rank 1 represents that the base station transmits downlink data to the UE by using a single layer, where the same data is transmitted via two different transmitting antennas of the base station to achieve space diversity; while the rank 2 represents that the base station transmits downlink data to the UE by using two different layers via the two different transmitting antennas to achieve space multiplexing. In addition, the rank with other numeral value may also exist in a practical wireless communication system, e.g., 4.

Rank adaptation relates to flexibly selecting, from a plurality of ranks allowed by the corresponding transmission mode, a rank for wireless communication between the base station and the UE. Throughput for the UE would be maximized if the rank is selected properly at the eNB side to match well with the real channel condition.

Usually, the eNB may determine the rank by several approaches as follows.

In one approach, the eNB may simply follow rank indication (RI) included in the channel state information (CSI) report received from the UE so as to perform data transmission. As an example of such approach, Chinese Patent Publication No. CN 101998498A, entitled "Rank self-adapting method and rank self-adapting device", discloses a rank self-adapting solution, where a rank receiving unit is used for receiving reported ranks of UE within a rank receiving window; a rank decision unit is used for determining a rank of the current moment according to the distribution state in the rank receiving window and determining the number of independent channels for downlink data transmission according to the determined rank of the current moment. The problem is that RI reported by UE might not always match well with the real channel quality. Different UEs may have different behaviors in CSI measurement due to different hardware, algorithms, delays etc, which may further bring inaccurate measurement of RI. A rank either under-estimated or over-estimated may result in lower throughput than it should be.

In another approach, the eNB may determine a rank according to any suitable parameter (e.g., SINR) indicative of channel quality. For example, rank 1 is adopted if estimated channel quality is below a certain threshold, otherwise rank 2. The parameter indicative of channel quality can be derived from the CQI report received from the UE or outer-loop link adaptation results according to configured rules by the communication system. As an example of such an approach, Chinese Patent Publication No. CN 102035580A, entitled "Method for retreating rank in spatial multiplexing mode, base station and communication system", discloses a rank adaptation solution for retreating rank in a spatial multiplexing mode, where a base station receives CQI and RI from a terminal; and when the RI is larger than 1, according to the CQI and preset threshold information, judging whether a downlink channel goes through deep fading with small scale, and if so, using degraded value than the RI reported by the terminal as the current rank used by the base station. However, in such approach, it's difficult to select a proper threshold since it's highly related to inter-layer interference (ILI) and ILI is unknown at the base station side.

In another approach, the eNB may estimate rank by sounding reference signal (SRS) or demodulation reference signal (DMRS) in uplink based on the uplink downlink channel reciprocity for a Time Division Duplex (TDD) system. In this approach, UE antenna selective transmission in uplink is required at the UE side, which is not always supported by all UEs. Furthermore, it's difficult to estimate downlink channel quality (e.g., signal to interference and noise ratio, SINR) by using uplink SRS and DMRS.

Therefore, it is desired to provide a novel solution for rank adaptation.

SUMMARY OF THE INVENTION

To solve at least one of the problems in the prior art, one or more method and apparatus embodiments according to the present invention aim to provide a solution for rank adaptation.

According to an aspect of the present invention, an embodiment of the present invention provides a method for rank adaptation at a base station. The method comprises performing, during a rank sounding time interval, data transmission for a user equipment by using a sounding rank. The sounding rank is different from a transmission rank that is used in a transmission time interval immediately prior to the rank sounding time interval. The method further comprises determining whether spectrum efficiency for the user equipment under the condition of using the sounding rank is better than spectrum efficiency under the condition of using the transmission rank; and adjusting, in response to a positive result obtained from the determining step, the transmission rank to the sounding rank so as to be used during a transmission time interval immediately next to the rank sounding time interval.

According to an aspect of the present invention, an embodiment of the present invention provides a base station. The base station comprises a data transmission module and a rank adaptation module. The data transmission module is configured to perform, during a rank sounding time interval, data transmission for a user equipment by using a sounding rank outputted from a rank adaptation module. The sounding rank is different from a transmission rank that is used in a transmission time interval immediately prior to the rank sounding time interval. The rank adaptation module comprises a determining unit configured to determine whether spectrum efficiency for the user equipment under the condition of using the sounding rank is better than spectrum efficiency under the condition of using the transmission rank; and an adjusting unit configured to adjust, in response to a positive result obtained from the determining unit, the transmission rank to the sounding rank so as to be outputted to the data transmission module during a transmission time interval immediately next to the rank sounding time interval.

According to an aspect of the present invention, an embodiment of the present invention provides an apparatus for rank adaptation at a base station. The apparatus comprises a transmitting unit for performing, during a rank sounding time interval, data transmission for a user equipment by using a sounding rank, wherein the sounding rank is different from a transmission rank that is used in a transmission time interval immediately prior to the rank sounding time interval; a determining unit for determining whether spectrum efficiency for the user equipment under the condition of using the sounding rank is better than spectrum efficiency under the condition of using the transmission rank; and an adjusting unit for adjusting, in response to a positive result obtained from the determining step, the transmission rank to the sounding rank so as to be used during a transmission time interval immediately next to the rank sounding time interval.

According to one or more embodiments of the present invention, the rank adaptation is performed at the base station by sounding with real traffic. It helps the base station to select a rank that matches real channel quality, thereby improving spectrum efficiency for the user equipment.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. For example, the embodiments of the present invention are not limited to be implemented in a LTE network. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
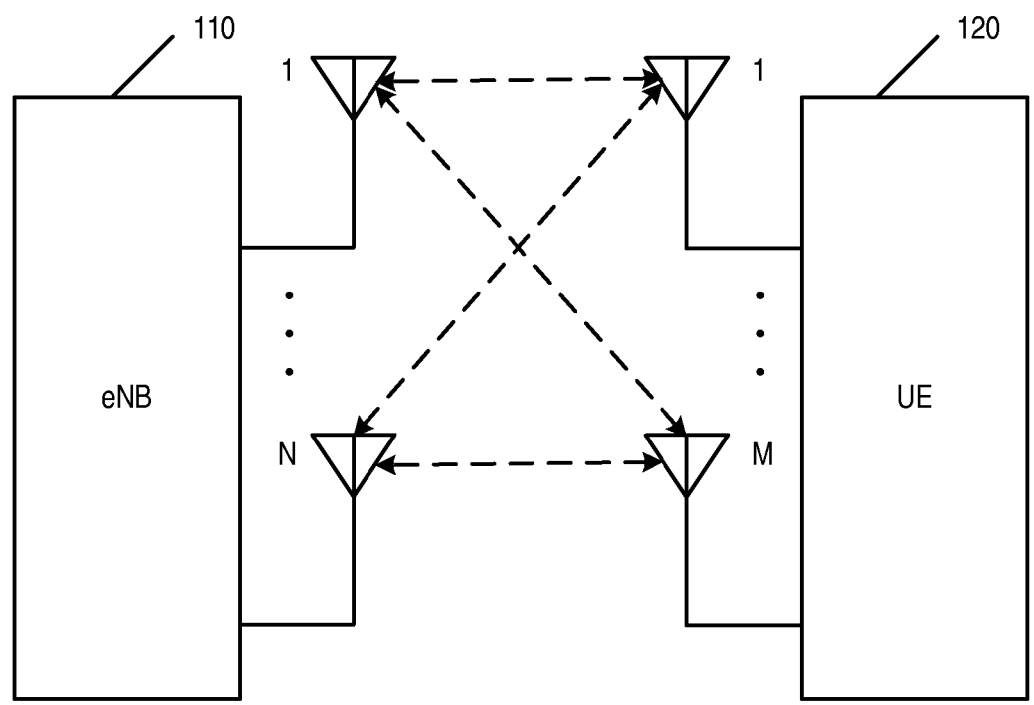
FIG. 1 schematically illustrates a block diagram of an exemplary MIMO wireless communication system 100 for rank adaptation that may be applied to embodiments of the present invention.

FIG. 1 is a block diagram illustrating an exemplary MIMO wireless communication system 100 for rank adaptation that may be applied to embodiments of the present invention. The multiple-antenna system 100, for example, may be applied to wireless access systems such as HSPA, CDMA 2000 and LTE, etc. As illustrated in FIG. 1, the multiple-antenna system 100 comprises a base station 110 (e.g., eNB) and a UE 120 communicating with the base station 110, wherein the base station 110 has N antennas while the UE 120 has M antennas to thereby constitute a N×M MIMO system. In an LTE system, it, for example, may constitute a 2×2 MIMO system, where N and M equal to 2 indicates that the MIMO system supports single-layer or dual-layer transmission, i.e. the value of a rank may take 1 or 2 as appropriate.

Figure 7:
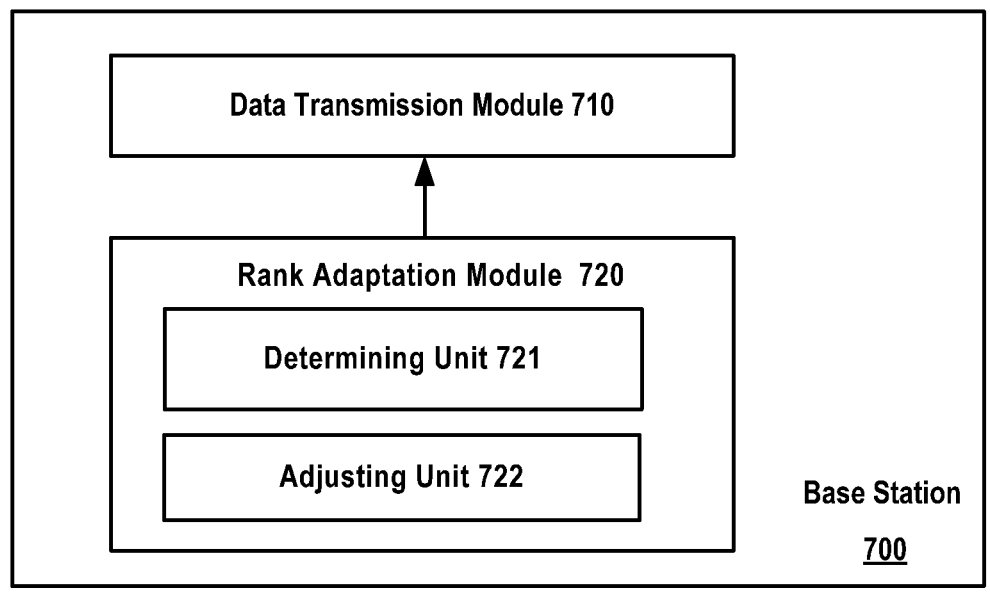
FIG. 7 schematically illustrates a block diagram of abase station according to one or more embodiments of the present invention.

In the illustrated multiple-antenna system 100, the base station 110 performs, during a sounding rank time interval, rank sounding with real traffic transmission and adjusts the rank to be used during a next transmission time interval based on the result of the rank sounding. The above operations of the base station 110 can be performed respectively by a data transmission module 710 and a rank adaptation module 720 of the apparatus 700 as illustrated in FIG. 7, which will be described below in detail with reference to FIG. 7.

The UE 120 is scheduled by the base station 110 to perform uplink and/or downlink data transmission by using a rank (either a sounding rank or a transmission rank) determined by the base station 110. The UE 120 may report CSI to the base station 110, which includes RI, PMI and CQI and helps the base station 110 to determine the rank.

With references to FIGS. 2 to 7, various embodiments of the present invention will be set forth in detail.

Figure 2:
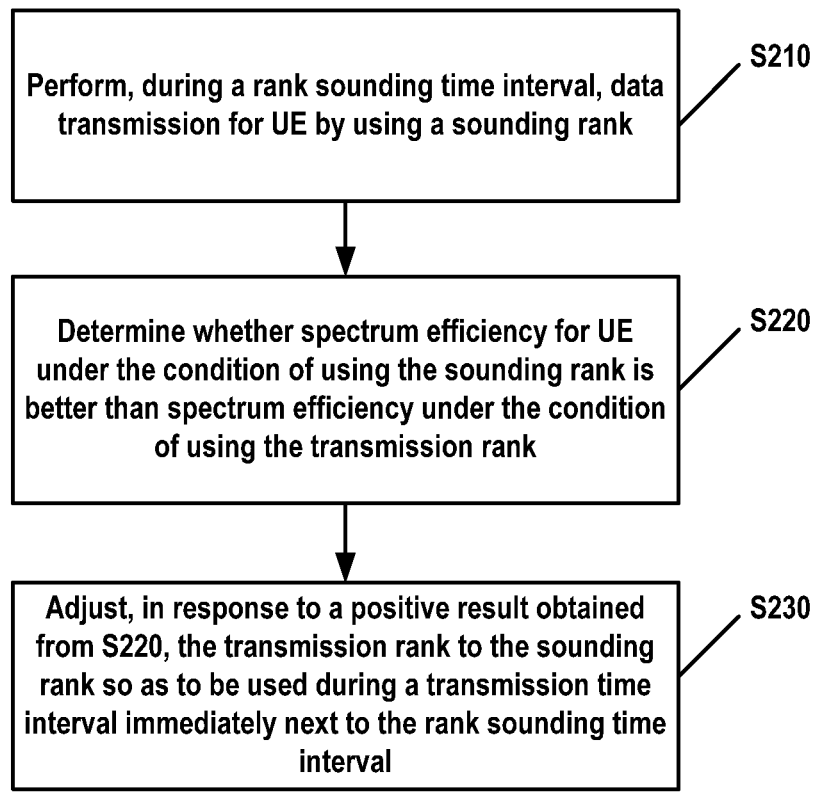
FIG. 2 schematically illustrates an exemplary flow chart of a method for rank adaptation at a base station according to one or more embodiments of the present invention.

FIG. 2 schematically illustrates an exemplary flow chart of a method 200 for rank adaptation at a base station according to one or more embodiments of the present invention.

As shown in FIG. 2, in step S210, data transmission is performed for a UE during a rank sounding time interval by using a sounding rank. The sounding rank is different from a transmission rank that is used in a transmission time interval immediately prior to the rank sounding time interval.

The rank sounding time interval is a short traffic transmission interval in which the base station performs data transmission by using the sounding rank. The rank sounding time interval is inserted into the normal data transmission in which the transmission rank is being used.

Figure 3A:
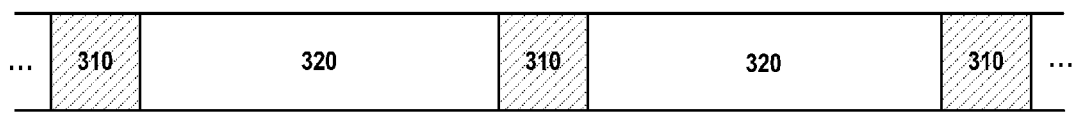
FIGS. 3A and 3B schematically illustrate two examples for scheduling/triggering rank sounding time intervals.
Figure 3B:
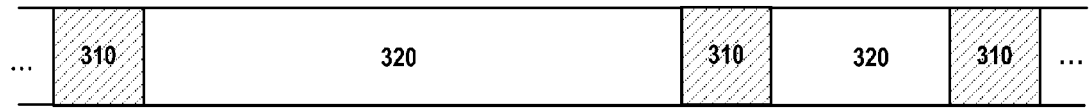

FIGS. 3A and 3B schematically illustrate two examples for scheduling/triggering rank sounding time intervals.

According to one or more embodiments of the present invention, as shown in FIG. 3A, the rank sounding time interval as illustrated by reference numeral 310 may be periodically scheduled for the UE. In this regard, the rank sounding time interval 310 can be periodically presented in normal data transmission (i.e., transmission time intervals as illustrated by reference numeral 320). The periodicity of rank sounding may be fixed or adjusted accordingly with channel variation. For instance, a long sounding cycle is applied for stationary UEs, while a short one for moving UEs.

According to one or more embodiments of the present invention, as shown in FIG. 3B, the rank sounding time interval as illustrated by reference numeral 310 can be triggered for the UE by at least one predefined trigger condition. In this regard, the rank sounding time interval 310 is triggered once the predefined condition(s) is satisfied. The predefined triggered conditions are indicative of a possibility that at least one idle rank (i.e., ranks other than the transmission rank currently being used) is more adaptive to a change of radio channel quality than the transmission rank currently being used.

Figure 4A:
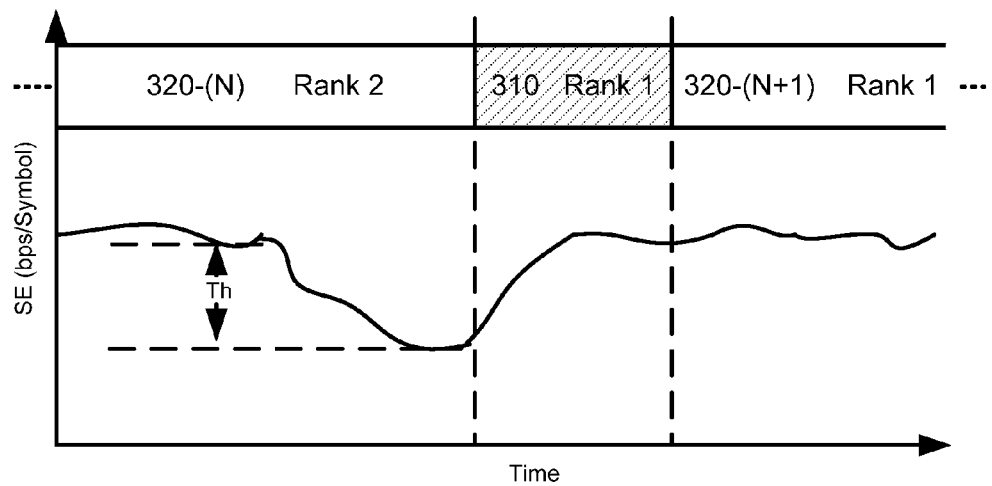
FIGS. 4A-4C schematically and exemplarily illustrate examples of predefined trigger conditions for triggering rank sounding time interval.
Figure 4B:
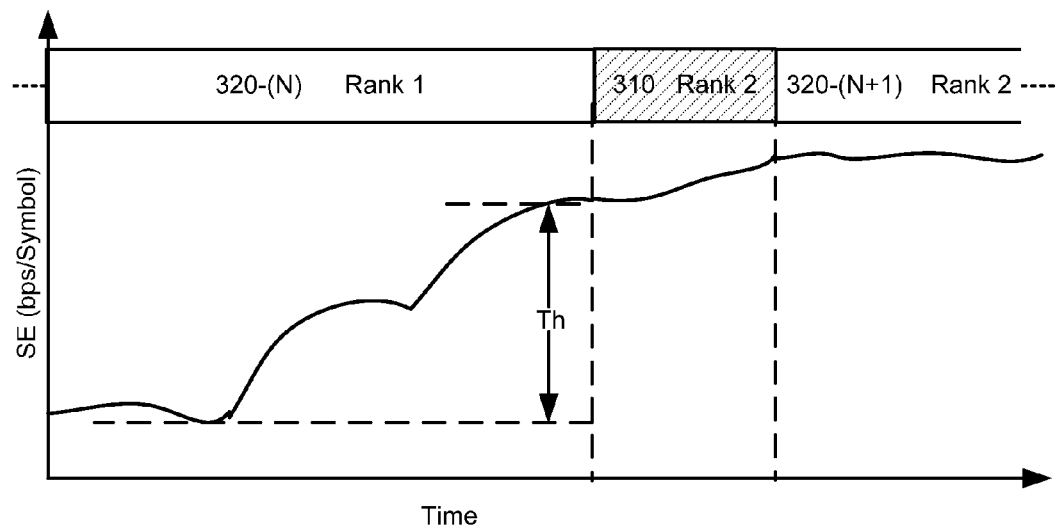
Figure 4C:
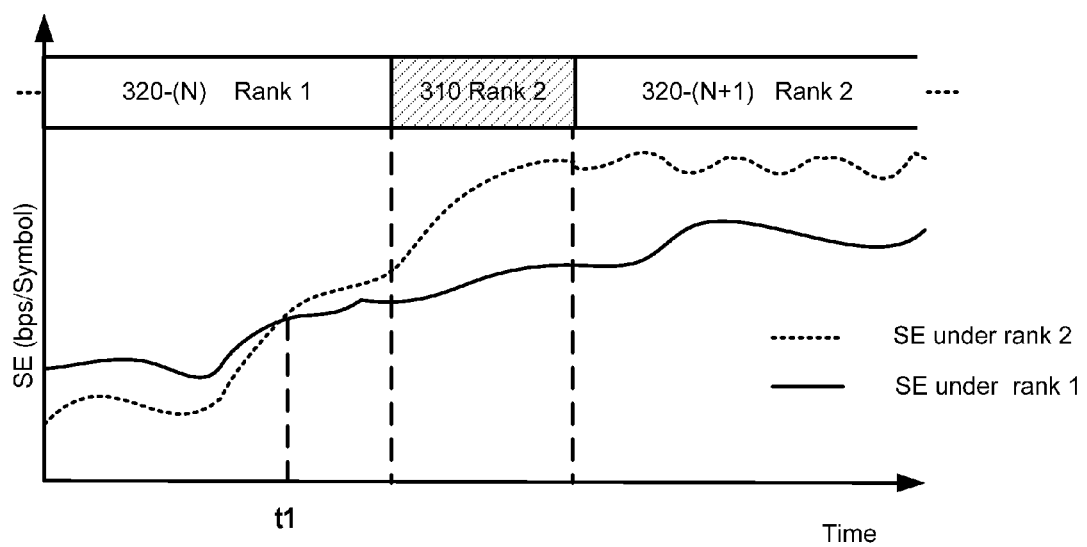

FIGS. 4A-4C schematically and exemplarily illustrates examples of predefined trigger conditions for triggering rank sounding time interval.

In an embodiment of the present invention, as shown in FIG. 4A, a rank sounding time interval 310 can be triggered if current spectrum efficiency under the condition of using the current transmission rank (greater than rank 1) during the transmission time interval 320-(N) is getting worse than a first predefined threshold. This trigger condition is indicative of a possibility that a rank lower than the current one may be selected from the idle ranks to adapt to real channel quality degradation.

Taking dual layer transmission mode (with the maximum rank 2) as an example, a spectrum efficiency evaluation procedure is maintained in the transmission time interval 320-(N) so as to monitor change of the spectrum efficiency for the UE. If rank 2 transmission is being adopted in the current transmission time interval 320-(N) and no reduction of the spectrum efficiency is detected or the detected reduction has not exceeded the first predefined threshold, the current transmission rank will keep unchanged in the current transmission time interval 320-(N). If the reduction of the spectrum efficiency exceeds the first predefined threshold, then a rank sounding time interval 310 will be triggered (as shown in FIG. 3A) and idle rank 1, which is lower than the current transmission rank, shall be sounded in the rank sounding time interval 310 to determine if rank 1 is better than current rank 2.

In an embodiment of the present invention, as shown in FIG. 4B, a rank sounding time interval 310 can be triggered if current spectrum efficiency under the condition of using the current transmission rank during a transmission time interval 320-(N) is getting better than a second predefined threshold, wherein the current transmission rank is less than a maximum allowed rank associated with a transmission mode being used between the base station and the UE. This trigger condition is indicative of a possibility that a rank higher than the current one may be selected from the idle ranks to adapt to real channel quality improvement.

Again, taking dual layer transmission mode (with the maximum rank 2) as an example, a spectrum efficiency evaluation procedure is maintained in the transmission time interval 320-(N) so as to monitor change of the spectrum efficiency for the UE. If rank 1 transmission is being adopted in the current transmission time interval 320-(N) and no increase of the spectrum efficiency is detected or the detected increase of the spectrum efficiency has not exceeded the second predefined threshold, the current transmission rank will keep unchanged in the current transmission time interval 320-(N). If the increase of the spectrum efficiency exceeds the second predefined threshold, then a rank sounding time interval 310 will be triggered (as shown in FIG. 3B) and idle rank 2, which is higher than the current transmission rank, shall be sounded in the rank sounding time interval 310 to determine if rank 2 is better than current rank 1.

In an embodiment of the present invention, as shown in FIG. 4C, a rank sounding time interval 310 can be triggered if current spectrum efficiency during a transmission time interval 320-(N) becomes worse than spectrum efficiency estimated based on channel quality information received from the UE. In this regard, the channel quality information is associated with the ranks reported by the UE that is different from the current transmission rank. This trigger condition is indicative of a possibility that the rank reported by the UE or other idle rank may be more adaptive to real channel quality than the current transmission rank.

Again, taking dual layer transmission mode (with the maximum rank 2) as an example, a spectrum efficiency evaluation procedure is maintained in the transmission time interval 320-(N) so as to monitor change of the spectrum efficiency for the UE. The spectrum efficiency based on UE-reported CQI can also be estimated upon receipt of the CSI report from the UE. If rank 1 transmission is being adopted in the current transmission time interval 320-(N) and it is detected in time instant t1 that the current spectrum efficiency under the condition of using rank 1 becomes worse than that estimated based on the UE-reported CQI associated with rank 2 (preferably by a predefined threshold), then a rank sounding time interval 310 will be triggered (as shown in FIG. 3C) and idle rank 2, which corresponds to the rank reported by the UE, shall be sounded in the rank sounding time interval 310 to see if rank 2 is better than current rank 1.

Although the examples of condition are explained in detail by taking dual layer transmission mode, those skilled in the art may appreciate that transmission mode with more than two layers may also adopt any one or combination of those trigger conditions without any restriction in technique. In addition, some or all of the trigger conditions can be either separately or jointly used in practice to trigger a rank sounding time interval and any combination usage of trigger conditions will not depart from the essence of the present invention.

Of course, those skilled in the art may define other trigger conditions to meet practical system requirements or transmission scenarios. Therefore, the trigger conditions as shown in FIGS. 4A-4C are not intended to limit or specify the scope of the present invention but provide illustrative examples.

Figure 5A:
FIGS. 5A and 5B schematically illustrate two exemplary rank sounding patterns.
Figure 5A:
Figure 5A:
Figure 5B:
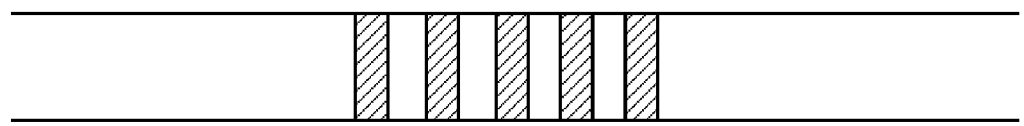
Figure 5B:
Figure 5B:

FIGS. 5A and 5B schematically illustrate two exemplary rank sounding patterns, which may be adopted by both periodical sounding and condition-triggered sounding.

FIG. 5A shows a localized pattern of rank sounding. A consecutive data transmission by using a sounding rank is scheduled as shown in FIG. 5A. The channel quality in a rank sounding time interval would be correlated with that in a transmission time interval if the sounding period is designed well.

FIG. 5B shows a distributed pattern of rank sounding. A rank sounding time interval is divided into a plurality of small time slices and inserted into normal data transmission in a distributed way as shown in FIG. 5B. Small time slices of the rank sounding interval with a relatively short length are interleaved with short transmission intervals. For instance, one of HARQ process can be used for rank sounding. It helps to get a more "synchronized" channel condition with normal data transmission.

Now return to FIG. 2. After performing rank sounding with normal data transmission, in step S220, it is determined whether spectrum efficiency for the UE under the condition of using the sounding rank is better than spectrum efficiency under the condition of using the transmission rank. In this regard, spectrum efficiency may be calculated, for example, based on adjusted SINR outputted from a link adaptation outer-loop module or further filtered to conquer the variance.

In an embodiment of the present invention, a predefined margin may be introduced to reduce the ping-pong effect in switching among ranks (e.g., between rank 1 and rank 2). It may be determined whether the spectrum efficiency under the condition of using the sounding rank is better than spectrum efficiency under the condition of using the transmission rank by the predefined margin.

In step S230, the transmission rank is adjusted to the sounding rank so as to be used during a transmission time interval immediately next to the rank sounding time interval, in response to a positive result obtained from the determining step S220, e.g., the spectrum efficiency for the UE under the condition of using the sounding rank is better than the spectrum efficiency under the condition of using the transmission rank.

According to one or more embodiments of the present invention, in response to a negative result obtained from the determining step S220, e.g., the spectrum efficiency for the UE under the condition of using the sounding rank is substantially equal (e.g., not exceeding the range of the predefined margin) or worse than the spectrum efficiency under the condition of using the transmission rank, the transmission rank is maintained unchanged so as to be used during the transmission interval immediately next to the rank sounding time interval.

Taking dual layer transmission mode (with the maximum rank 2) as an example, the transmission rank for the next transmission time interval can be determined as follows:

---

If (rank-1 is used) && ($SE_{rank2} > SE_{rank1} * K_{12}$)
  Rank-2 is selected;
Elseif (rank2 is used) && ($SE_{rank1} > SE_{rank2} * K_{21}$)
  Rank-1 is selected;
Else
  The transmission rank used during previous
  transmission time interval is used.
End

--- where SE denotes spectrum efficiency; $K_{21}$ and $K_{12}$ denote predefined margins to reduce ping-pang effects between rank 1 and rank 2 and can be larger than 1. For example, $K_{21}$ and $K_{12}$ may be values falling into an interval (1, 1.5].

According to one or more embodiments of the present invention, the method 200 may further comprise a switching-back step (not shown in FIG. 2) to reduce the overhead of rank sounding. The sounding rank may be switched back to the previous transmission rank immediately, without waiting for the rank sounding time interval expiration in response to at least one switching-back trigger condition indicative of significant performance degradation. The at least one switching-back trigger condition may be selected from a group comprising: a maximum number of HARQ retransmission attempts being reached; an intolerable block error rate based on acknowledgement and negative acknowledgement reports from said UE being detected; and a difference between spectrum efficiency in said rank sounding time interval and that in said transmission time interval immediately prior to said rank sounding time interval being worse than a third predefined threshold.

Figure 6:
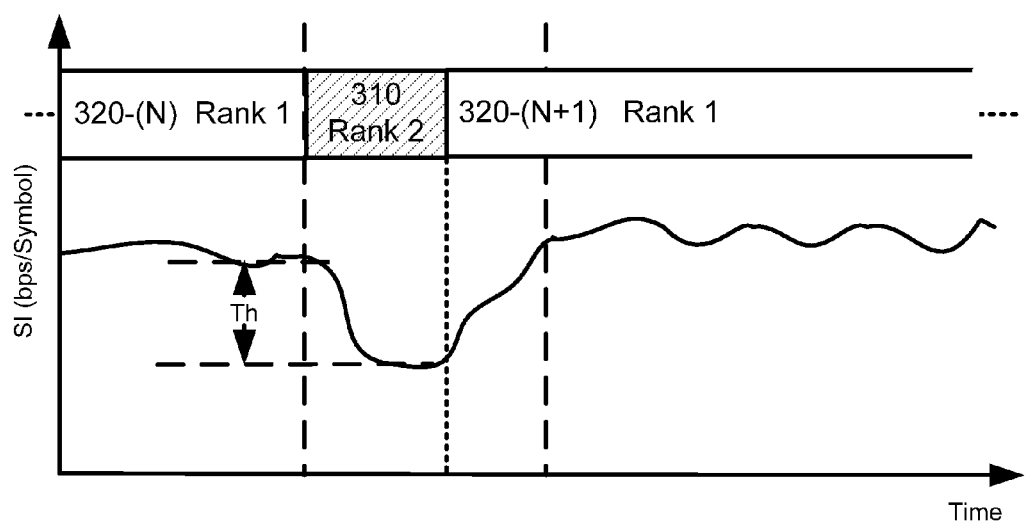
FIG. 6 schematically illustrates fast rank switching-back in a rank sounding time interval.

As shown in FIG. 6, in the transmission time interval 320-(N), rank 1 is adopted to perform data transmission. And rank 2 is then used to perform rank sounding during the rank sounding time interval 310. However, even in the rank sounding time interval 310, using rank 2 has brought significant performance degradation. Once such situation is detected, The sounding rank 2 may be switched immediately back to the transmission rank 1, without waiting for expiration of the rank sounding time interval 310.

According to one or more embodiments of the present invention, in order to further control the overhead of rank sounding especially for high-layer (more than two layers) transmission mode, the rank sounding can be adaptively controlled within a certain rank range. In other word, a set of idle ranks may be excluded from being used as the sounding rank, based on the transmission rank currently being used and conditional information of the UE.

For example, the conditional information may include spectrum efficiency actually achieved by the UE. In some specific cases, the rank can be determined directly according to the achieved spectrum efficiency without trying some impossible idle ranks. For instance, in case the spectrum efficiency under the condition of using rank-2 transmission is higher than an absolutely high threshold (e.g. 6 bps/Symbol), rank 2 can be determined as the transmission rank and rank-1 sounding can be prohibited, in which the maximum spectrum efficiency is 6 bps/Symbol. Similarly, if the spectrum efficiency under the condition of rank 1 is lower than an absolutely low threshold (e.g. 0.5 bps/Symbol), then rank-1 can be determined as the transmission rank and rank-2 sounding can be prohibited.

The set of idle ranks to be excluded may also be determined based on other conditional information of the UE, such as geometry information of said UE, reported rank and channel quality information from said UE, uplink sounding channel quality of said UE, and so on.

It should be noted that as specified in 3GPP, the UE needs to report CQI/PMI based on latest rank. Once transmission rank is overridden (re-determined) by the base station, the mismatched CQI/PMI shall be handled for modulation coding scheme (MCS) selection and resources allocation at the base station. Those skilled in the art may adopt any suitable approach to modify UE-report CQI and PMI according to the rank overridden by the base station.

For CQI handling, in an example, the mismatched CQI is adjusted by an offset to adapt current rank overridden by the base station. In another example, the most recently received CQI which matches the determined rank may be used to calculate adjusted SINR by the base station. As such, the most recently CQIs corresponding to different ranks are required to be recorded.

For PMI handling, when mismatched PMI received from UE, the reported PMI may be re-mapped to an appropriate PMI according to current rank being used and precoding book specified by 3GPP. It should be noted that PMI handling has no impacts on rank sounding.

FIG. 7 schematically illustrates a block diagram of a base station 700 according to one or more embodiments of the present invention.

As shown in FIG. 7, the base station 700 comprises a data transmission module 710 and a rank adaptation module 720.

The data transmission module 710 is configured to perform, during a rank sounding time interval, data transmission for a UE by using a sounding rank outputted from a rank adaptation module. The sounding rank is different from a transmission rank that is used in a transmission time interval immediately prior to the rank sounding time interval.

According to one or more embodiments of the present invention, the rank sounding time interval may be periodically scheduled for the UE.

According to one or more embodiments of the present invention, the rank sounding time interval may be triggered for the UE by at least one predefined trigger condition, which is indicative of a possibility that at least one idle rank is more adaptive to a change of radio channel quality than the transmission rank currently being used.

In an embodiment of the present invention, the at least one predefined trigger condition is selected from a group comprising:

current spectrum efficiency under the condition of using a first rank during a transmission time interval getting worse than a first predefined threshold, wherein the first rank is greater than 1;

current spectrum efficiency under the condition of using a second rank during a transmission time interval getting better than a second predefined threshold, wherein the second rank is less than a maximum allowed rank associated with a transmission mode being used between the base station and the UE; and current spectrum efficiency during a transmission time interval becoming worse than spectrum efficiency estimated based on channel quality information received from the UE, wherein the channel quality information is associated with a rank reported by the UE which is different from the transmission rank being used during the transmission time interval.

In one or more embodiments, the data transmission by using the sounding rank may be performed in a centralized sounding pattern during the rank sounding time interval. In other some embodiments, the data transmission by using the sounding rank may be performed in a distributed sounding pattern during the rank sounding time interval.

The rank adaptation module 720 comprises a determining unit 721 and an adjusting unit 722.

The determining unit 721 is configured to determine whether spectrum efficiency for the UE under the condition of using the sounding rank is better than spectrum efficiency under the condition of using the transmission rank. In one or more embodiments of the present invention, the determining unit 721 may be configured to determine whether the spectrum efficiency under the condition of using the sounding rank is better than spectrum efficiency under the condition of using the transmission rank by a predefined margin, so as to reduce ping-pang effect caused in switching between different ranks.

The adjusting unit 722 is configured to adjust, in response to a positive result obtained from the determining unit 721, the transmission rank to the sounding rank so as to be outputted to the data transmission module during a transmission time interval immediately next to the rank sounding time interval.

According to one or more embodiments of the present invention, the adjusting unit 722 of the rank adaptation module 720 may be further configured to maintain, in response to a negative result obtained from the determining unit 721, the transmission rank so as to be used by the data transmission module 710 during the transmission interval immediately next to the rank sounding time interval.

According to one or more embodiments of the present invention, the determining unit 721 of the adaptation module 720 may be further configured to exclude a set of idle ranks from being used as the sounding rank, based on the transmission rank currently being used and one or more conditional information of the UE. In some implementations, the conditional information may include spectrum efficiency actually achieved by the UE, geometry information of the UE, reported rank and channel quality information from the UE, uplink sounding channel quality of the UE, and so on.

According to one or more embodiments of the present invention, the adjusting unit 722 of the adaptation module 720 may be further configured to switch the sounding rank back to the transmission rank immediately, without waiting for the rank sounding time interval expiration in response to at least one switching-back trigger condition indicative of significant performance degradation. In one or more embodiments of the present invention, the switching-back trigger condition may be selected from a group comprising a maximum number of HARQ retransmission attempts being reached; an intolerable block error rate based on acknowledgement and negative acknowledgement reports from said user equipment being detected; a difference between spectrum efficiency in said rank sounding time interval and that in said transmission time interval immediately prior to said rank sounding time interval being worse than a third predefined threshold; and so on.

Here, the base station 700 as illustrated in FIG. 7 is described with the modules or components which are most relevant to the embodiments of the present invention. However, those skilled in the art can appreciate that the base station 700 also comprises conventional functional modules such as outer-loop adjusting module (not shown FIG. 7), MCS selection and resource allocation module (not shown FIG. 7) and other modules and components for performing the functionality of cellular communication, including antennas; transceiver (having a transmitter (TX) and a receiver (RX)); processors such as one or more of general purpose computers, special purpose computers, microprocessors, digital signal processors (DSPs) and processors based on multi-core processor architecture; memory module of any type suitable to the local technical environment and implemented using any suitable data storage technology; etc. Those modules or components are well known in the art and the description thereof is omitted for the purpose of conciseness.

According to one or more embodiments of the present invention, the rank adaptation is performed at the base station by sounding with real traffic. It helps the base station to select a rank that matches real channel quality, thereby improving spectrum efficiency for the UE.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for rank adaptation at a base station, comprising:
    performing, during a rank sounding time interval, data transmission for a user equipment by using a sounding rank, wherein said sounding rank is different from a transmission rank that is used in a transmission time interval immediately prior to said rank sounding time interval;
    determining whether spectrum efficiency for said user equipment under the condition of using said sounding rank is better than spectrum efficiency under the condition of using said transmission rank; and
    adjusting, in response to a positive result obtained from the determining step, said transmission rank to said sounding rank so as to be used during a transmission time interval immediately next to said rank sounding time interval.

2. The method according to claim 1, further comprising maintaining, in response to a negative result obtained from the determining step, said transmission rank so as to be used during said transmission interval immediately next to said rank sounding time interval.

3. The method according to claim 1, wherein said rank sounding time interval is periodically scheduled for said user equipment.

4. The method according to claim 1, wherein said rank sounding time interval is triggered for said user equipment by at least one predefined trigger condition.

5. The method according to claim 4, wherein said at least one predefined trigger condition is indicative of a possibility that at least one idle rank is more adaptive to a change of radio channel quality than said transmission rank currently being used.

6. The method according to claim 5, wherein said at least one predefined trigger condition is selected from a group comprising:
    current spectrum efficiency under the condition of using a first rank during a transmission time interval getting worse than a first predefined threshold, wherein said first rank is greater than 1;
    current spectrum efficiency under the condition of using a second rank during a transmission time interval getting better than a second predefined threshold, wherein said second rank is less than a maximum allowed rank associated with a transmission mode being used between said base station and said user equipment; and
    current spectrum efficiency during a transmission time interval becoming worse than spectrum efficiency estimated based on channel quality information received from said user equipment, wherein said channel quality information is associated with a rank reported by said user equipment which is different from said transmission rank being used during said transmission time interval.

7. The method according to claim 1, wherein said determining step comprises:
    determining whether said spectrum efficiency under the condition of using said sounding rank is better than spectrum efficiency under the condition of using said transmission rank by a predefined margin.

8. The method according to claim 1, further comprising:
    switching said sounding rank back to said transmission rank immediately, without waiting for expiration of said rank sounding time interval, in response to at least one switching-back trigger condition indicative of significant performance degradation.

9. The method according to claim 8, wherein said at least one switching-back trigger condition is selected from a group comprising:
    a maximum number of HARQ retransmission attempts being reached;
    an intolerable block error rate based on acknowledgement and negative acknowledgement reports from said user equipment being detected; and
    a difference between spectrum efficiency in said rank sounding time interval and that in said transmission time interval immediately prior to said rank sounding time interval being worse than a third predefined threshold.

10. The method according to claim 1, further comprising:
    excluding a set of idle ranks from being used as the sounding rank, based on said transmission rank currently being used and conditional information of said user equipment.

11. A base station comprising:
    a data transmission module configured to perform, during a rank sounding time interval, data transmission for a user equipment by using a sounding rank outputted from a rank adaptation module, wherein said sounding rank is different from a transmission rank that is used in a transmission time interval immediately prior to said rank sounding time interval;
    said rank adaptation module comprising:
        a determining unit configured to determine whether spectrum efficiency for said user equipment under the condition of using said sounding rank is better than spectrum efficiency under the condition of using said transmission rank; and
        an adjusting unit configured to adjust, in response to a positive result obtained from said determining unit, said transmission rank to said sounding rank so as to be outputted to said data transmission module during a transmission time interval immediately next to said rank sounding time interval.

12. The base station according to claim 11, wherein said adjusting unit of said rank adaptation module is further configured to maintain, in response to a negative result obtained from said determining unit, said transmission rank so as to be used by said data transmission module during said transmission interval immediately next to said rank sounding time interval.

13. The base station according to claim 11, wherein said rank sounding time interval is triggered for said user equipment by at least one predefined trigger condition.

14. The base station according to claim 13, wherein said at least one predefined triggered condition is indicative of a possibility that at least one idle rank is more adaptive to a change of radio channel quality than said transmission rank currently being used.

15. The base station according to claim 14, wherein said at least one predefined trigger condition is selected from a group comprising:
  current spectrum efficiency under the condition of using a first rank during a transmission time interval getting worse than a first predefined threshold, wherein said first rank is greater than 1;
  current spectrum efficiency under the condition of using a second rank during a transmission time interval getting better than a second predefined threshold, wherein said second rank is less than a maximum allowed rank associated with a transmission mode being used between said base station and said user equipment; and
  current spectrum efficiency during a transmission time interval becoming worse than spectrum efficiency estimated based on channel quality information received from said user equipment, wherein said channel quality information is associated with a rank reported by said user equipment which is different from said transmission rank being used during said transmission time interval.

16. The base station according to claim 11, wherein the adjusting unit of said adaptation module is further configured to switch said sounding rank back to said transmission rank immediately, without waiting for expiration of said rank sounding time interval in response to at least one switching-back trigger condition indicative of significant performance degradation.

17. The base station according to claim 11, wherein said determining unit of said adaptation module is further configured to exclude a set of idle ranks from being used as the sounding rank, based on said transmission rank currently being used and one or more conditional information of said user equipment.

18. An apparatus for rank adaptation at a base station, comprising:
  a transmitting unit for performing, during a rank sounding time interval, data transmission for a user equipment by using a sounding rank, wherein said sounding rank is different from a transmission rank that is used in a transmission time interval immediately prior to said rank sounding time interval;
  a determining unit for determining whether spectrum efficiency for said user equipment under the condition of using said sounding rank is better than spectrum efficiency under the condition of using said transmission rank; and
  an adjusting unit for adjusting, in response to a positive result obtained from the determining step, said transmission rank to said sounding rank so as to be used during a transmission time interval immediately next to said rank sounding time interval.

\* \* \* \* \*